Patented Nov. 9, 1948

2,453,478

UNITED STATES PATENT OFFICE 2,453,478

PHENYL- AND PHENYLALKYLAMINO-METHYLENEPHENACETURATES

Arthur W. Weston, Waukegan, Ill., assignor to Abbott Laboratories, North Chicago, Ill., a corporation of Illinois No Drawing. Application January 16, 1946,
Serial No. 641,635

4 Claims. (Cl. 260—471)

This invention relates to organic chemical compounds which are useful as intermediates in synthesis of substances having an action antagonistic to pathogenic microorganisms. The compounds disclosed herein are useful in synthesis of penicillin and/or compounds related to penicillin.

The utility of these compounds lies in the fact that they are crystalline derivatives of penaldic esters. Penaldic esters may be represented by the formula $$C_6H_5CH_2\overset{O}{\overset{\|}{C}}-NHCH-CHO$$
$$\phantom{C_6H_5CH_2\overset{O}{\overset{\|}{C}}-NH}|\phantom{CH-CHO}$$
$$\phantom{C_6H_5CH_2\overset{O}{\overset{\|}{C}}-NHCH}COOR$$

where R is an alkyl or aralkyl group. These penaldic esters have heretofore been available only as crude intractable oils. The compounds of this invention under proper experimental conditions react as alkyl penaldates and yield the same reaction products. They are therefore important intermediates for preparing any penaldate derivatives e. g. penicilloates, etc. It is thereby possible to work with definite amounts of the solid crystalline penaldate derivatives rather than with a crude oil which varies in composition. In addition a much better reaction product is obtained.

EXAMPLE I

*Ethyl α-benzylaminomethylenephenaceturate*

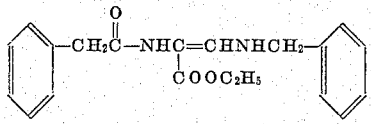

To a solution of 4.6 g. (g.=grams) of crude ethyl penaldate in 10 cc. (cc.=cubic centimeters) of dry ether, 2.2 g. of benzylamine is added. There is an immediate reaction. On standing several hours 4.1 g. of solid separates which has a melting point of 105–107° (all temperatures are in degrees centigrade). After crystallization from a methanol-petroleum ether mixture, the product melts at 106–107°.

In this compound as well as the succeeding ones it is believed that the position of one of the double bonds may shift to the position indicated in the following formula

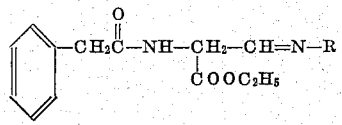

R represents the remainder of the particular molecule.

EXAMPLE II

*Ethyl α-anilinomethylenephenaceturate*

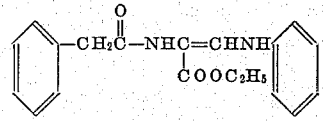

2.0 g. of aniline is added to a solution of 4.6 g. of crude ethyl penaldate in 10 cc. of dry ether. An immediate reaction ensues. After standing several hours a solid separated which is collected by filtration and washed with ether. There is thus obtained a product having a melting point of 156–158°. After crystallization from alcohol the melting point is 158.–159°.

EXAMPLE III

*Ethyl α-carbethoxymethylaminomethylenephenaceturate*

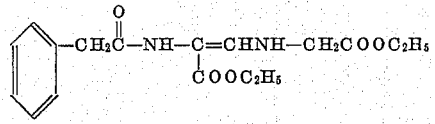

To 4.6 g. of crude ethyl penaldate in 10 cc. of dry ether, 2,3 g. of ethyl glycinate is added. An immediate reaction takes place. After standing several hours the reaction mixture is cooled and the crystals collected by filtration. There is thus obtained a product which melts at 97–98°. The compound may be crystallize from a benzene-ether mixture and then melts at 99–100°.

Without further elaboration the foregoing will so fully explain my invention that others may adopt the same for use under various conditions of service. It will, for instance, be obvious that in place of the amino compounds used there may be substituted any amino compound which will react with a penaldate to give a solid product and which may later be removed from the molecule by appropriate treatment. As at present advised with respect to the apparent scope of my invention, I claim the following subject matter and equivalents thereof.

I claim:

1. The product ethyl α-benzylaminomethylenephenaceturate.

2. The compound ethyl α-anilinomethylene-phenaceturate represented by the formula

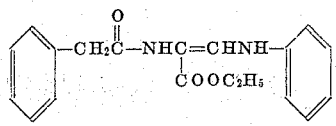

3. Compounds represented by the formula

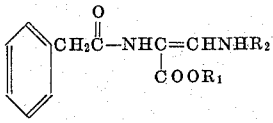

where $R_1$ is an alkyl group and $R_2$ represents a member selected from the class consisting of benzyl and phenyl groups.

4. The method of preparing solid derivatives of penaldic alkyl esters which comprises reacting said esters with a compound selected from the class consisting of benzylamine and aniline.

ARTHUR W. WESTON.

REFERENCES CITED

The following references are of record in the file of this patent:

UNITED STATES PATENTS

| Number | Name | Date |
|---|---|---|
| 2,394,967 | Kushner | Feb. 12, 1946 |

OTHER REFERENCES

Merck, "Studies on the Structure and Synthesis of Penicillin G and Related Compounds," XIIa, February 29, 1944, pages 6 and 7.

Abbott, "Laboratory Progress Report," to March 14, 1944 A-IV, pages 3 and 4.

"Report on Status of Chemical Work Regarding Penicillin Done in Lilly Research Laboratories," March 15, 1944, page 16.